United States Patent [19]

Choiniere et al.

[11] Patent Number: 5,449,285
[45] Date of Patent: Sep. 12, 1995

[54] MOLD FOR MOLDING A RESIN TO FORM A COMPLEX ARTICLE

[75] Inventors: Alan L. Choiniere, Stratham, N.H.; Michael F. Whelihan, Tewksbury, Mass.

[73] Assignee: Davidson Textron, Inc., Dover, N.H.

[21] Appl. No.: 219,661

[22] Filed: Mar. 29, 1994

[51] Int. Cl.⁶ .......................................... B29C 45/34
[52] U.S. Cl. ................................ 425/546; 249/141; 425/577; 425/812
[58] Field of Search ............. 425/546, 577, 812; 249/141

[56] References Cited

U.S. PATENT DOCUMENTS

| | | | |
|---|---|---|---|
| 1,184,259 | 5/1916 | Price | 264/102 |
| 2,468,760 | 5/1949 | Kempthorn | 425/812 |
| 2,779,386 | 1/1957 | Waters | 156/87 |
| 3,550,212 | 12/1970 | Gray | 249/141 |
| 3,555,620 | 1/1971 | Bucy | 425/546 |
| 3,889,919 | 6/1975 | Ladney, Jr. | 249/141 |
| 3,914,361 | 10/1975 | Shiina et al. | 264/45.4 |
| 4,208,368 | 6/1980 | Egli | 425/546 |
| 4,359,443 | 11/1982 | Michaels | 264/328.2 |
| 4,562,026 | 12/1985 | Mosher | 264/135 |
| 4,923,667 | 5/1990 | Sayer | 425/546 |
| 4,966,543 | 10/1990 | Krishnakumar et al. | 425/522 |
| 5,273,417 | 12/1993 | Nelson | 425/812 |

*Primary Examiner*—James P. Mackey
*Attorney, Agent, or Firm*—Reising, Ethington, Barnard & Perry

[57] ABSTRACT

The mold (10) for forming an article includes a first mold member (16) with a first mold surface (24) and a second mold member (18) with a second mold surface (26). When the mold (10) is closed, the first and second mold surfaces (24) and (26) form a mold cavity (28). Lances (58) are forced into the mold cavity (28) by linear actuators (60) to pierce an article (12) and then withdrawn from the mold chamber. Each Lance (58) allows gas under pressure to escape from the article (12) through the clearance between the lance and the bore (56) in which the lance is mounted. Relieving gas pressure in the article (12) allows the mold (10) to be opened without distortion of the article and shortens mold cycle time.

8 Claims, 2 Drawing Sheets

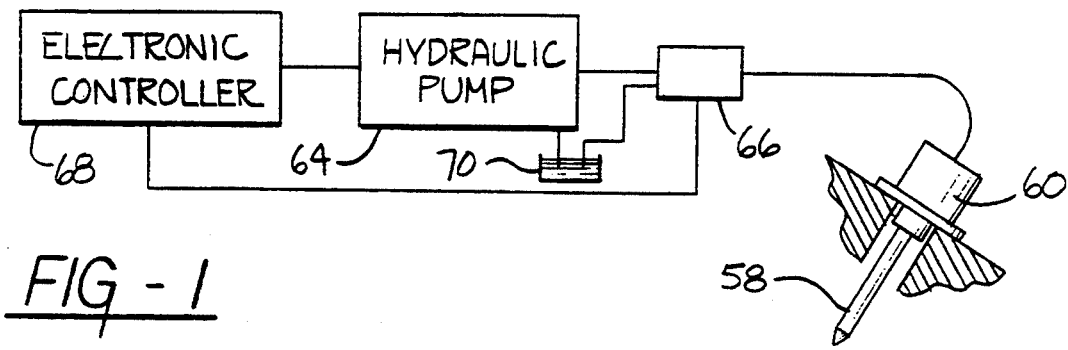
FIG-1
FIG-2
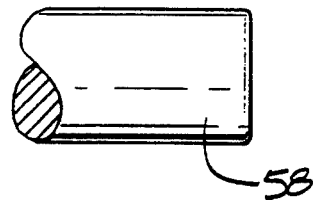
FIG-3
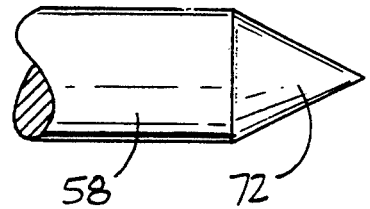
FIG-5
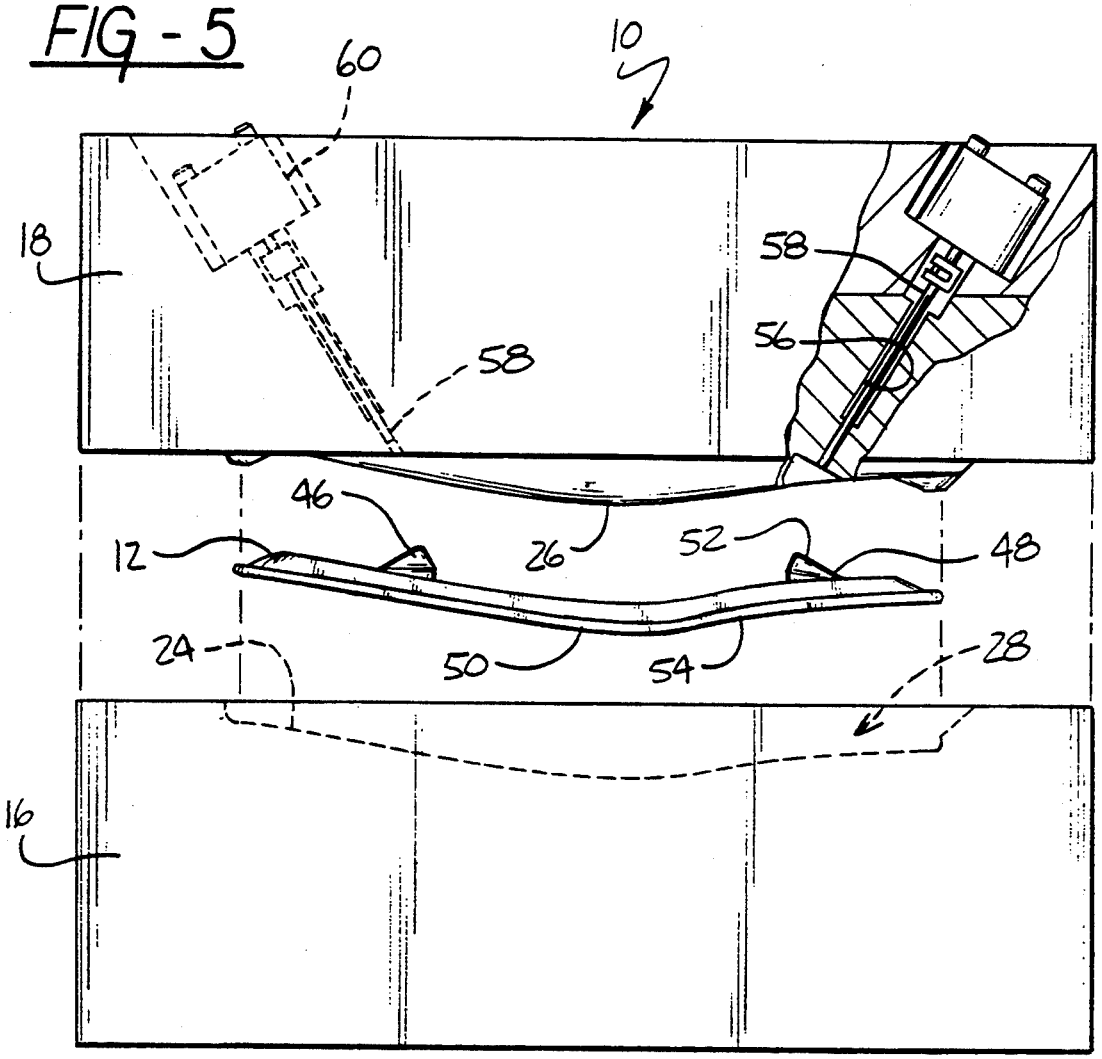

5,449,285

MOLD FOR MOLDING A RESIN TO FORM A COMPLEX ARTICLE

TECHNICAL FIELD

The invention relates to a mold for molding a resin to form a complex article and more particularly to a mold with a lance that enters the mold cavity and pierces an article to reduce gas pressure in the article before the mold is opened.

BACKGROUND OF THE INVENTION

Articles formed in a mold, from resins such as urethane, require a cure period within the mold. The cure period allows the material green strength to increase to a stage which retains article shape when the article is removed from the mold. Articles which do not have sufficient material green strength to retain their shape when they are removed from a mold can become distorted, lose their shape and be useable.

The length of the cure period required to attain sufficient material green strength depends upon a number of factors. These factors include the chemical properties of the resin used, the size and shape of the molded article, the temperature of the article and the rate of temperature change of the molded article. The length of the cure period changes mold cycle time. Mold cycle time, which is the total time required from the removal of one molded article from a mold cavity until a second molded article is ready to be removed from the same mold cavity, is very important because the cost of molded articles is directly related to mold cycle time.

A molded article with a uniform thickness would attain a sufficient material green strength throughout the article after a predetermined cure period. Molded articles which vary in thickness and shape from one area of the article to another area of the article can be referred to as complex articles. Complex articles attain sufficient material green strength in one area in less time than is required to attain sufficient material green strength in another area of the same article. To attain sufficient green strength, articles have been held in mold cavities until the area that takes the longest time to cure has attained sufficient green strength to maintain its shape outside the mold cavity.

Articles made from resins that are formed in a mold generally cure from the outer surface toward their center. The center is the last area of these articles to attain sufficient green strength and the center in the areas that are thick is the last part of the center to attain sufficient green strength. Removal of a molded article from a mold before all areas have attained sufficient green strength will result in the surface of the article being expanded outwardly by the exotherm pressure build-up in the areas with thick cross-sections. Outward expansion of the surfaces of a molded article changes the surface configuration and may distort portions of the article which have attained sufficient green strength. The areas of an article with the thickest cross-section generally act as reinforcing ribs. Distortion of reinforcing ribs will distort other areas of an article which are relatively thin.

SUMMARY OF THE INVENTION

An object of the invention is to reduce distortion of molded articles made from a resin.

Another object of the invention is to reduce the length of the cure period and thereby reduce mold cycle time.

A further object of the invention is to allow designers of articles that are molded from resins, the ability to employ areas with thick cross-sections and increased strength at minimal cost.

The mold for molding a resin to form an article includes a first mold member and a second mold member. The first and second mold members have mold surfaces that cooperate to form a mold cavity. The mold cavity is opened and closed by moving the mold members relative to each other.

A bore is provided in one of the mold members and passes through the mold surface. A lance is slidably mounted in the bore. A fluid activated linear actuator is attached to the lance. The linear actuator is activated to extend a portion of the lance into the mold cavity or to retract the lance into the bore and out of the mold cavity.

The lance pierces an article in the mold cavity when it is extended from the bore by the linear actuator. The passage pierced in the article that is being molded releases gas from the inside of the molded article. The gas passes out of the mold cavity through a clearance between the lance and the bore. Releasing gas from the inside of a molded article reduces pressure inside the molded article. Reducing internal pressure reduces distortion and thereby reduces mold cycle time and molded article cost.

The lance preferably has a blunt end and prevents resin from entering the bore. However, the lance may have a sharp or pointed end to facilitate entry into the molded article. The lance normally enters the molded article through a surface that is covered up when the molded article is in use.

A plurality of lances can be employed to allow gas to escape from various parts of a molded article. After the gas has escaped and the lances are retracted from the mold cavity, the mold can be opened and the molded article can be removed.

DESCRIPTION OF THE DRAWING

FIG. 1 is a schematic view of a lance, a linear actuator and a linear actuator control system;

FIG. 2 is an enlarged view of the portion of a lance that enters a mold cavity;

FIG. 3 is a view similar to FIG. 2 showing an alternate lance.

FIG. 5 is an elevational view of an open mold with parts broken away to show a lance that is retracted from the mold cavity and a molded part that is being removed from the mold.

DESCRIPTION OF THE PREFERRED EMBODIMENT

Figure 4:
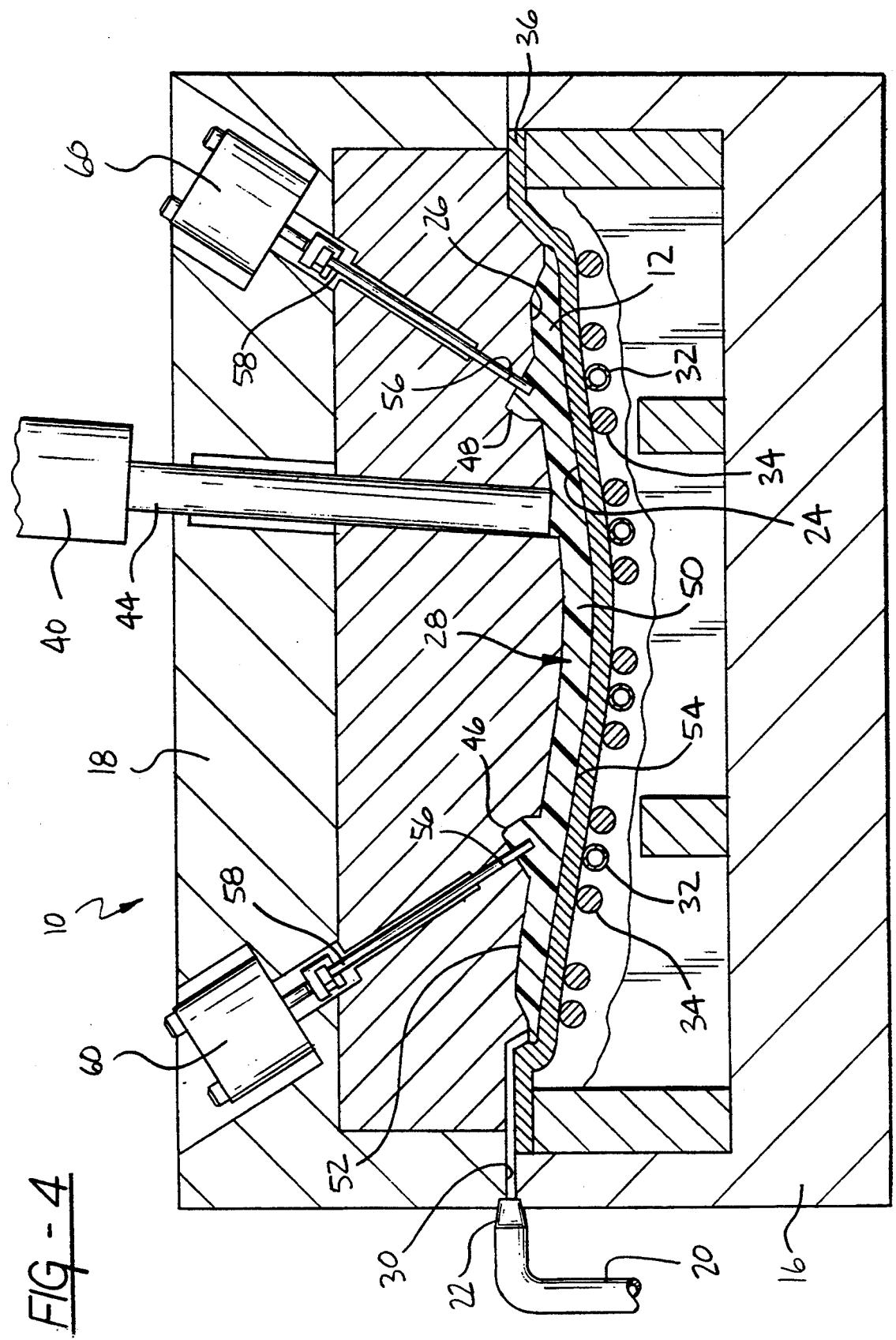
FIG. 4 is a cross-sectional view of a closed mold, two lances projecting into the mold cavity and two linear actuators.

The mold 10 for molding a resin such as urethane to form a complex article 12 has a first mold member 16 and a second mold member 18 shown in FIG. 4 and 5. Hydraulic cylinders (not shown) are provided to move the second mold member 18 vertically away from the first mold member 16 and open the mold 10. The hydraulic cylinders also move the second mold member 18 toward the first mold member 16 and close the mold 10.

A relatively simple mold 10 is shown in the drawing and described above. The mold 10 has only a first mold member 16 and a second mold member 18. To mold some articles it may be necessary to employ three or more mold members. The first mold member 16 is fixed as shown. In some molds the first mold member 16 is movable and the second mold member 18 is fixed. In other molds, all of the mold members are movable relative to a base. The first and second mold members 16 and 18 could be pivotally attached to each other if the article 12 to be formed in the mold 10 could accommodate pivotal movement of the mold members relative to each other.

The first mold member 16 has a first mold surface 24 that partially defines the mold cavity 28. The second mold member 18 has a second mold surface 26 that also partially defines the mold cavity 28. The mold surface 24 is the surface of a mold insert 36. The mold insert 36 is used to provide the desired surface finish on the article 12. When the mold 10 is closed, the first mold surface 24 cooperates with the second mold surface 26 to form a mold cavity 28. The first mold surface 24 and the second mold surface 26 are shaped to form the desired article 12. The mold surfaces can have an infinite number of different shapes. The mold surfaces 24 and 26 may include portions that are convex and extend outwardly into the other mold member 16 or 18 if required to mold an article with the desired shape. The second mold surface 26, as shown in FIGS. 4 and 5, is convex and extends into the first mold member 16.

The mold 10, as shown in the drawing, is for molding articles 12 from a urethane foam. A urethane prepolymer is pumped from a prepolymer storage tank to a mixing chamber by a pump. A catalyst is pumped from a catalyst storage tank to the mixing chamber by a pump. The mixed catalyst and prepolymer pass through a pipe 20 from the mixing chamber and are injected into the mold cavity 28 through an injector 22 and a material delivery gate 30.

Resins other than urethane are molded and cured in molds. Some resins are heated and then pumped into molds 10 in a hot melted state. Other resins are placed in the mold cavity 28 in a powder or granular form and then heated in the mold 10. It is common to provide heaters for heating molds and a resin inside the mold. Regulated liquid passages 32 have been provided in mold members 16 and 18 to activate resins that require heat. Electric heaters 34 have also been used in mold members 16 and 18 to provide heat when heat is required. Cooling passages may also be employed in a mold 10 if required.

Urethane is formed by a chemical reaction between a prepolymer and a catalyst. Time is required for the chemical reaction to take place and for curing. The mold 10 for molding urethane may not have heaters or special cooling passages. Ambient air may provide sufficient cooling.

The urethane starts to cure and attain a material green strength after the resin is injected into the mold cavity 28. Urethane, like many other resins cures from the outside in. An outer skin is formed on the article 12 first. The pressure inside the article 12 increases during the curing process. Due to the internal pressure increase, molded articles have to remain in a closed mold until the article has sufficient material green strength to retain its shape. If an article is removed from the mold too soon the internal pressure will expand the article by separating the outside surfaces to relieve the internal pressure or separate the internal cell structure to form a bladder separating surfaces 52 and 54.

The molded urethane article shown in FIG. 5 has two elongated ribs 46 and 48. The cross-sectional area of the elongated ribs 46 and 48 is substantially larger than the Cross-sectional area of the panel portions 50 of the article 12. The elongated ribs 46 and 48 require a longer curing period or time in the mold 10 to attain sufficient material green strength to maintain the molded shape of the article 12. If the article 12 is removed from the mold 10 as soon as the center panel portion 50 has attained sufficient material green strength to maintain its molded thickness, the internal pressure in the area of the elongated ribs 46 and 48 will separate the upper surface 52 of the elongated ribs from the lower surface 54 of the article adjacent to the elongated ribs. This separation of the upper surface 52 and the lower surface 54 will distort the elongated ribs 46 and 48 and/or the upper and lower surfaces of the article 12. Because the elongated ribs 46 and 48 reinforce the article 12, distortion of the elongated ribs may distort the entire article including the panel portions 50. Distortion of the article 12 can be avoided by leaving the mold 10 closed for a longer period of time. Increasing the cure time in the mold 10 increases the mold cycle time. Increased mold cycle time increased the cost of producing the article 12.

Distortion of an article 12 can be avoided by relieving the internal pressure in the elongated ribs 46 and 48 before the mold 10 is opened and the molded article 12 is removed. Internal pressure can be relieved by piercing the elongated ribs and allowing gas to escape. If the elongated ribs 46 and 48 are pierced and gas escapes from the mold 10, the mold cycle time for an article with ribs can be substantially the same as the mold cycle time for the same article 12 without ribs.

A bore 56 in the second mold member 18 passes through the second mold surface 26. A lance 58 is slidably mounted in the bore 56. A linear actuator 60 is connected to the lance 58. Extension of the linear actuator 60 will move a portion of the lance 58 out of the bore 56 and into the mold cavity 28. Retraction of the linear actuator 60 will withdraw the lance 58 from the mold cavity 28. When the linear actuator 60 is extended, the lance 58 pierces the elongated rib 46 or 48 of the article 12. Piercing the article 12 allows gas under pressure to escape from the article, pass through the clearance space between the bore 56 and the lance 58 and out of the mold 10. The linear actuator 60 is then retracted and the lance 58 is withdrawn from the mold cavity 28. When the lance 58 is withdrawn from the mold cavity 28, the blunt end 62 of the lance 58 closes the end of the bore 56 as shown in FIG. 5 and prevents the entry of resin into the bore. The clearance space between the lance 58 and the bore 56 is sized to prevent the entry of urethane into the bore 56.

There are preferably at least two lances 58 mounted in the mold 10 to pierce each elongated rib 46 or 48. Long ribs 46 and 48 may need to be pierced by more than two lances 58 to relieve the internal pressure.

The linear actuators 60 are hydraulic cylinders that receive hydraulic fluid from a hydraulic pump 64 and a valve 66. The valve 66 is controlled by an electronic control 68 that directs fluid under pressure to the linear actuator and fluid from the linear actuator to a sump 70. The linear actuators 60 could also be pneumatic cylinders or solenoids.

The lance 58 has a blunt end 62 as stated above and as shown in FIG. 2. The lance 58 could also have a sharp or pointed end 72 as shown in FIG. 3. If a sharp or pointed end 72 is employed, a small quantity of resin will be able to enter the bore 56.

The mold 10 can be opened following withdrawal of the lances 58 from the mold cavity 28 and the article 12. The article 12 may remain in contact with first mold surface 24 or the second mold surface 26 when the mold 10 is opened. The article 12 shown in the drawing will normally remain in contact with the second mold surface 26 when the mold 10 is opened. An ejector shaft 44 and an ejector actuator 40 can be provided if needed. The ejector actuator 40 forces the ejector shaft 44 through the second mold surface 26 and separates the article 12 from the second mold surface. Ejectors can be employed in any mold member where they are required.

Preferred embodiments of the invention have been described in detail but are examples only and the invention is not restricted thereto. It will be easily understood by those skilled in the art that modifications and variations can easily be made within the scope of the invention.

We claim:

1. A mold, for molding a resin to form a complex article, comprising:
    a first mold member with a first mold surface that partially defines a mold cavity;
    a second mold member, with a second mold surface that partially defines said mold cavity, movable relative to the first mold member between an open position in which said mold cavity is open and a closed position in which the first mold surface and the second mold surface cooperate to define said mold cavity;
    a first bore in one of the mold members and through one of the mold surfaces;
    a first lance slidably mounted in the first bore and having an end portion that is slidable into and out of said mold cavity when the mold cavity is closed;
    a clearance between the first lance and the first bore sized to prevent the passage of resin through the first bore; and
    an actuator connected to the first lance and operable to extend said end portion of the first lance out of said first bore and into the closed cavity to pierce the complex article being formed in the mold cavity and to retract the first lance into said first bore and out of the closed mold cavity; and
    wherein the end portion of the first lance which projects into the closed mold cavity when the first lance is extended into the closed mold cavity is sharpened to facilitate penetration of said article.

2. A mold, for molding a resin to form a complex article as set forth in claim 1 wherein the clearance between the first lance and the first bore is sized to permit the passage of gas between a wall of the first bore and the first lance and out of the mold cavity.

3. A mold, for molding a resin to form a complex article as set forth in claim 1 wherein the sharpened end of the first lance which projects into the mold cavity when the first lance is extended into the closed mold cavity, substantially blocks the flow of resin into said first bore when the lance is retracted from the closed mold cavity by said actuator.

4. A mold, for molding a resin to form a complex article as set forth in claim 1 wherein the actuator connected to the first lance is a fluid operated linear actuator.

5. A mold, for molding a resin to form a complex article as set forth in claim 4 wherein the fluid operated linear actuator is activated by an incompressible fluid.

6. A mold for molding a resin to form a complex article as set forth in claim 1 further comprising:
    a second bore in one of the mold members;
    a second lance slidably mounted in the second bore and having an end portion that is slidable into and out of said mold cavity when the mold cavity is closed;
    a clearance between the second lance and the second bore sized to prevent the passage of resin through the second bore; and
    an actuator connected to the second lance and operable to extend said end portion of the second lance out of said second bore and into the closed mold cavity to pierce the complex article being formed in the closed mold cavity and to retract the second lance into said second bore and out of the closed mold cavity.

7. A mold, for molding a resin to form a complex article as set forth in claim 6 wherein the clearance between the first lance and the first bore is sized to permit the passage of gas between a wall of the first bore and the first lance and out of the article being formed in the closed mold cavity; and
    wherein the clearance between the second lance and the second bore is sized to permit the passage of gas between a wall of the second bore and the second lance and out of the article being formed in the closed mold cavity.

8. A mold for molding a resin to form a complex article as set forth in claim 8 wherein the actuator connected to the first lance is a fluid operated linear actuator and wherein the actuator connected to the second lance is a fluid operated linear actuator.

* * * * *